(12) United States Patent
Bird et al.

(10) Patent No.: US 11,104,215 B2
(45) Date of Patent: Aug. 31, 2021

(54) METHOD OF ASSEMBLING HYBRID TRANSMISSION

(71) Applicant: Ford Global Technologies, LLC, Dearborn, MI (US)

(72) Inventors: Norman Jerry Bird, Plymouth, MI (US); Raunak Singh Bindra, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 15/662,672

(22) Filed: Jul. 28, 2017

(65) Prior Publication Data

US 2019/0031012 A1    Jan. 31, 2019

(51) Int. Cl.
| | | |
|---|---|---|
| *B60K 6/383* | (2007.10) | |
| *B60K 6/387* | (2007.10) | |
| *B60K 6/40* | (2007.10) | |
| *H02K 15/03* | (2006.01) | |
| *H02K 7/00* | (2006.01) | |
| *H02K 1/27* | (2006.01) | |
| *H02K 7/10* | (2006.01) | |
| *F16D 41/12* | (2006.01) | |
| *F16H 3/72* | (2006.01) | |

(52) U.S. Cl.
CPC ............. *B60K 6/383* (2013.01); *B60K 6/387* (2013.01); *B60K 6/40* (2013.01); *H02K 1/276* (2013.01); *H02K 7/006* (2013.01); *H02K 7/10* (2013.01); *H02K 15/03* (2013.01); *F16D 41/125* (2013.01); *F16H 3/728* (2013.01)

(58) Field of Classification Search
CPC ......... F16H 25/2204; H02P 9/06; B04B 9/10; B04B 13/00; B23Q 1/58
USPC .......................................................... 318/14
See application file for complete search history.

(56) References Cited

U.S. PATENT DOCUMENTS

| | | | | |
|---|---|---|---|---|
| 3,732,447 | A * | 5/1973 | Perhats | H02K 7/10 |
| | | | | 310/76 |
| 4,918,802 | A * | 4/1990 | Schaefer | H02K 1/278 |
| | | | | 29/598 |
| 6,008,545 | A | 12/1999 | Nagano et al. | |
| 6,122,817 | A * | 9/2000 | Meacham | H02K 1/28 |
| | | | | 29/596 |
| 6,634,866 | B2 | 10/2003 | Vukovich et al. | |
| 7,389,707 | B2 | 6/2008 | Murase et al. | |
| 9,242,543 | B2 | 1/2016 | Oriet | |
| 9,388,864 | B2 | 7/2016 | Ando | |
| 2009/0124400 | A1 | 5/2009 | Mikami | |
| 2013/0213027 | A1* | 8/2013 | Bird | F16D 41/12 |
| | | | | 60/361 |
| 2014/0277892 | A1* | 9/2014 | Harada | B60W 10/30 |
| | | | | 701/22 |

(Continued)

*Primary Examiner* — Kawing Chan
*Assistant Examiner* — Bradley R Brown
(74) *Attorney, Agent, or Firm* — David B. Kelley; Brooks Kushman P.C.

(57) ABSTRACT

A hybrid transmission includes a permanent magnet rotor which is selectively held against rotation by a one-way-clutch. The one-way-clutch utilizes a pocket plate having a plurality of pawls which engages with an inner race in response to energizing a magnetic coil. The pocket plate is fixed to the rotor shaft and restrains the laminates axially, eliminating the need for one of the end plates.

8 Claims, 6 Drawing Sheets

(56) References Cited

U.S. PATENT DOCUMENTS

| | | | |
|---|---|---|---|
| 2015/0047942 A1* | 2/2015 | Kimes | F16D 41/125 |
| | | | 192/56.1 |
| 2015/0343890 A1 | 12/2015 | Ortmann et al. | |
| 2016/0200311 A1* | 7/2016 | Nefcy | B60W 10/06 |
| | | | 701/22 |
| 2017/0070108 A1* | 3/2017 | Gorton | H02K 15/03 |
| 2017/0244292 A1* | 8/2017 | Zhong | H02K 1/30 |

* cited by examiner

METHOD OF ASSEMBLING HYBRID TRANSMISSION

TECHNICAL FIELD

This disclosure related to the field of hybrid electric vehicles. More particularly, the disclosure relates to a method of assembling a transmission having a motor and a one-way clutch.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

In order to reduce fuel consumption, some vehicles include hybrid powertrains which utilize energy storage to supplement the power produced by the internal combustion engine. These powertrains permit the vehicle to operate a portion of the time with the engine off and the remainder of the time at torque levels at which the engine is more efficient. Hybrid powertrains also enable the capture and later use of energy that would otherwise be dissipated by the braking system.

SUMMARY

A method of assembling a hybrid transmission sliding a stack of laminates onto a shaft, inserting magnets into the stack of laminates, inserting the shaft into a one-way-clutch pocket plate, and tightening a nut onto the shaft. The method may also include sliding an end cap onto the shaft before sliding the stack of laminates onto the shaft such that the end cap is axially restrained from sliding further onto the shaft. The laminates and the pocket plate each have a tab that engages a slot in the shaft to preclude relative rotation. The nut secures the pocket plate and stack of laminates to the shaft. A plurality of pawls may be inserted into the pocket plate. The assembly that includes the pocket plate, shaft, and laminates may then be inserted into a transmission housing such that the pawls are adjacent to an inner one-way-clutch race. The inner one-way-clutch race has an electric coil configured to create a magnetic field attracting the pawls into engagement with the inner one-way-clutch race. In some embodiments, the pocket plate is formed as a single die-cast part. In some other embodiments, pocket plate is formed by laser welding a flat portion to an annular portion. The flat portion and the annular portion may each have chamfered surfaces adjacent to the weld.

A hybrid transmission includes an end plate, a stack of laminates, a slotted rotor shaft, a one-way-clutch pocket plate, and a nut. The stack of laminates contains permanent magnets. The slotted rotor shaft extends through the stack of laminates and the end plate and restrains the end plate axially. The laminates and the pocket plate each have a tab that engages a slot in the shaft to preclude relative rotation. The nut secures the pocket plate and stack of laminates axially against the end plate. The transmission may also include a transmission case, a plurality of pawls, and a one-way-clutch inner race. The plurality of pawls are retained in the pocket plate. The one-way-clutch inner race is proximate to the pocket plate. The inner race includes an electric coil configured to create a magnetic field attracting the pawls into engagement with the inner race. The transmission may also include a simple planetary gear set and a second rotor. The simple planetary gear set includes a sun gear fixed to the rotor shaft, a ring gear drivably connected to an output shaft, and a carrier fixed to an input shaft. The second rotor is drivably connected to the output shaft.

A one-way-clutch pocket plate includes a flat portion, an annular portion, and a plurality of pawls. The flat portion defines an aperture and defines at least one tab extending into the aperture. The at least one tab is configured to engage slots of a rotor shaft to prevent relative rotation. The annular portion is rigidly fixed to the flat portion and is concentric with the aperture. The annular portion defines a plurality of pockets retaining the plurality of pawls. The plurality of pockets may be formed on a radially inner surface of the annular portion.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
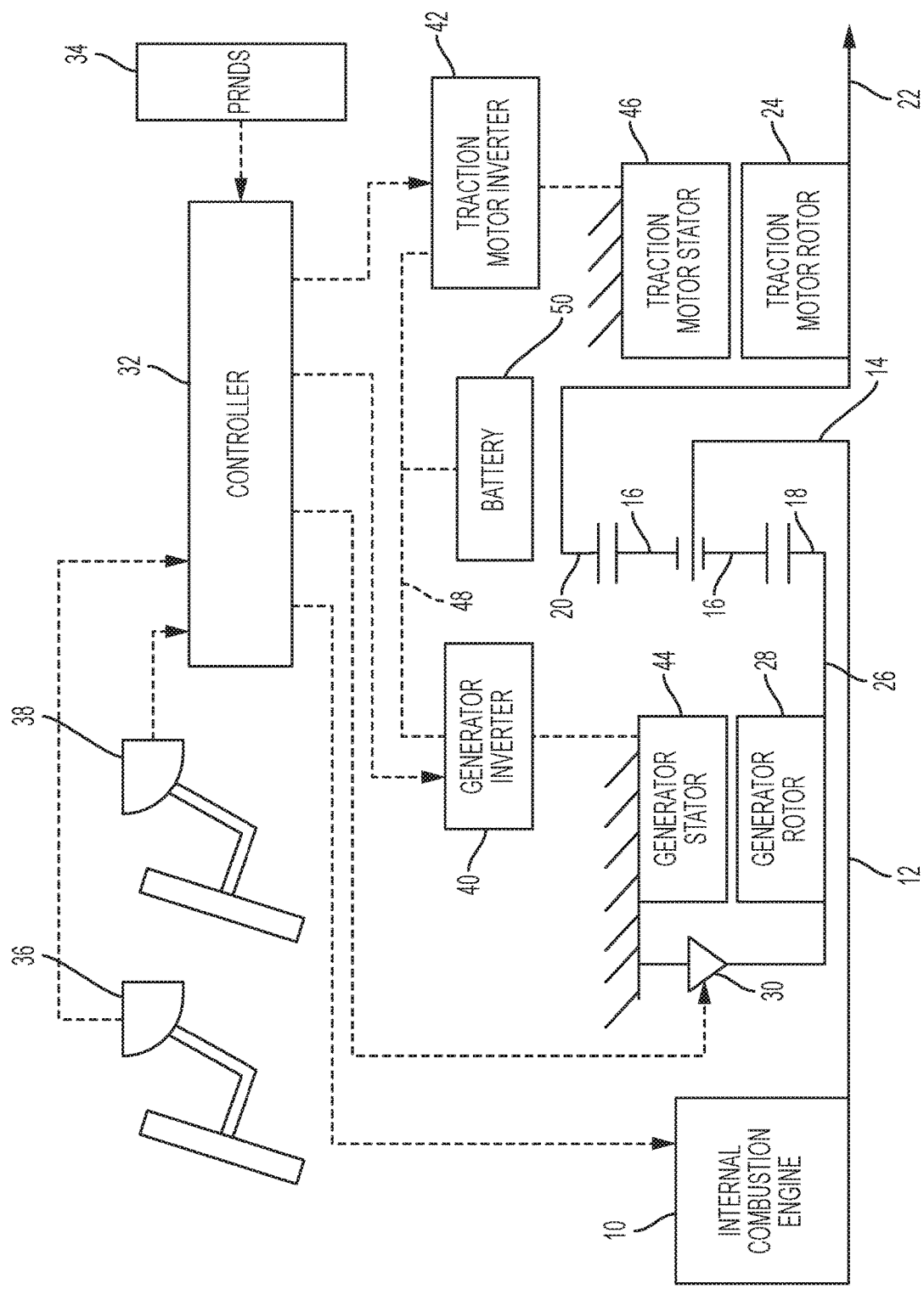
FIG. 1 is a schematic diagram illustrating a hybrid vehicle powertrain.

A powersplit hybrid powertrain is illustrated schematically in FIG. 1. Mechanical power flow connections are indicated by solid lines. Electrical power connections are indicated by bold dashed lines. Flow of information signals is indicated by non-bold dashed lines. Primary motive power is provided by internal combustion engine 10 driving input shaft 12. Input shaft 12 is fixedly coupled to planet carrier 14. Several planet gears 16 are supported for rotation with respect to planet carrier 14. Each planet gear meshes with external gear teeth on sun gear 18 and with internal gear teeth on ring gear 20. Ring gear 20 is fixedly coupled to output shaft 22 which drives vehicle wheels (not shown).

A rotor 24 of a first electric machine is fixedly coupled to output shaft 22. In alternative embodiments, rotor 24 may be driveably connected to output shaft 22 via a mechanical power flow path. Sun gear 18 is fixedly coupled to generator shaft 26. A rotor 28 of a second electric machine is fixedly coupled to the generator shaft 26. The first and second electric machines are both reversible electric machines capable of converting electrical power into mechanical power and also converting mechanical power into electrical power. For convenience, the first electric machine is called the traction motor and the second electric machine is called the generator. Generator shaft 26 is also selectively held against rotation in one direction by selectable one-way-clutch (SOWC) 30. SOWC 30 is a two-state device. In a disengaged state, SOWC does not restrain the rotation of generator shaft 26 in either direction. In an engaged state, SOWC restrains generator shaft 26 from rotating in the opposite direction of engine rotation but permits rotation in the engine rotation direction.

Controller 32 issues signals to control various components of the powertrain. These signals are based on inputs from several sensors. These sensors include shift lever position sensor 34, brake pedal position sensor 36, and accelerator pedal position sensor 38. Controller 32 issues commands to engine 10 to start and stop the engine and to adjust the level of torque produced when the engine is running. Controller 32 issues commands to SOWC 30 to switch between the engaged and the disengaged states. Controller 32 adjusts the torque produced by the electrical machines by issuing command to inverters 40 and 42. Inverters 40 and 42 adjust the alternating current in windings of stators 44 and 46 respectively to cause the commanded torque on respective rotors 28 and 24. When torque is applied in the opposite direction of rotor rotation, the inverter generates direct current electrical power which is delivered to the DC bus 48. Conversely, when torque is applied in the same direction as rotor rotation, the inverter draws electrical power from DC bus 48. Any net surplus of electric energy is stored in battery 50 for later use during times of net deficit.

When using engine power to propel the vehicle at low vehicle speed, the planetary gear set splits power from engine 10 into a mechanical power flow path and an electrical power flow path. At slow to moderate speeds of ring gear 20, sun gear 18 rotates in the same direction as carrier 14. To provide a reaction torque, the generator is operated to generate torque in the opposite direction. The mechanical power flow path conveys power from carrier 14 to ring gear 20 to the output shaft. When the sun gear is rotating forward, the generator produces electrical power. This power is transmitted via an electrical power flow path from the generator to the DC bus to the motor which converts it back into mechanical power at the output shaft. When the vehicle speed is high relative to the engine speed, sun gear 18 rotates in the opposite direction. In this condition, power circulates within the powertrain. More power is transmitted via the mechanical power flow path than is delivered to the output shaft. Some mechanical power is extracted by the traction motor and delivered to the generator such that the generator can provide the torque reaction.

Recirculating power flow conditions are generally less efficient than direct power flow conditions. To avoid use of recirculating power flow, SOWC 30 may be commanded to the engaged state. In this state, SOWC provides the torque reaction at sun gear 18. Thus, the power flowing through the electrical power flow path is equal to the power delivered at the output shaft.

Figure 2:
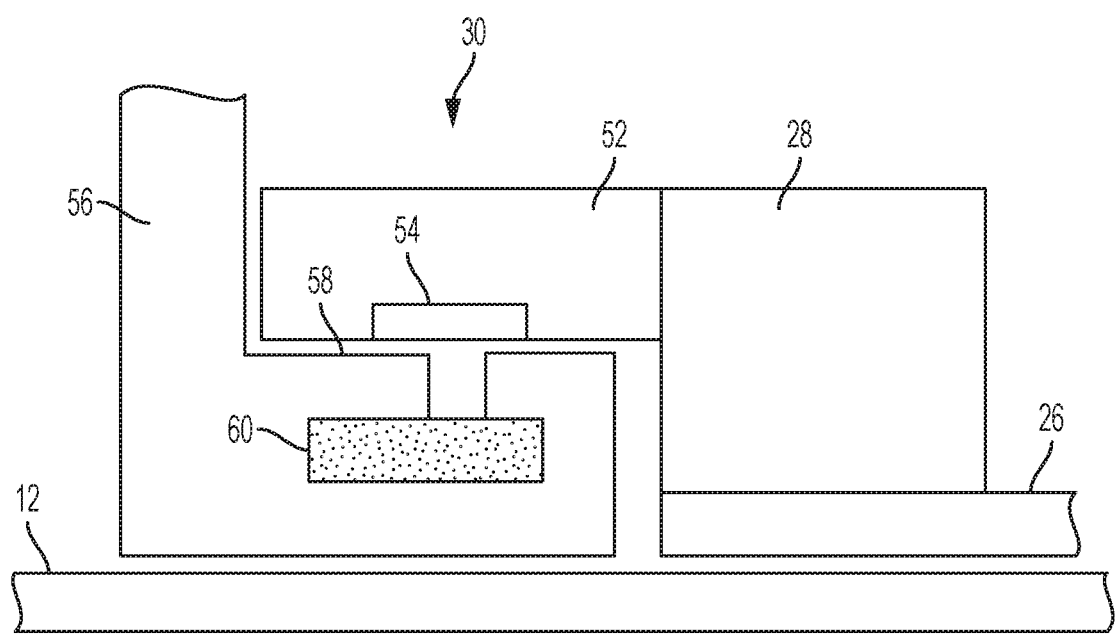
FIG. 2 is a schematic cross section of the selectable one-way-clutch and generator rotor of the powertrain of FIG. 1.

FIG. 2 is a schematic cross section of a portion of the powertrain of FIG. 1 illustrating the structure of SOWC 30. One-way-clutch pocket plate 52 is fixed to generator rotor 28. Several pawls 54 are supported within pocket plate 52 at locations around the inner periphery. The pocket plate is the outer race of SOWC 30. The inner race 56 of SOWC 30 is fixed to the transmission housing such that it is stationary. The outer periphery 58 of the inner race includes teeth. In the disengaged state, the pawls 54 are held out of engagement with the teeth by springs or other means. In the engaged state, electrical current is supplied to circumferential windings 60 in the inner race to establish a magnetic field. Magnetic forces pull the pawls 54 toward the teeth and into engagement with the teeth. The teeth are sloped such that the pocket plate can rotate with respect to the inner race in one direction in the engaged state. However, the pawls and teeth engage to prevent rotation in the other direction.

Figure 3:
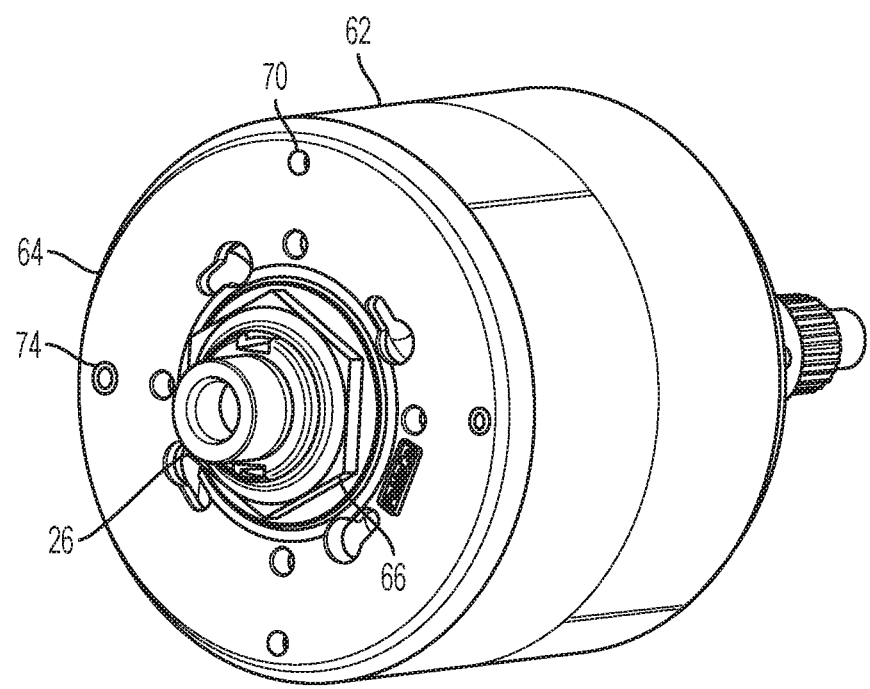
FIG. 3 is a pictorial view of the generator rotor of FIG. 2.

FIG. 3 illustrates a permanent magnet motor. One of more stacks 62 of steel laminates are fixed to rotor shaft 26. Permanent magnets are inserted into the laminates to create alternating magnetic poles around the circumference. Steel is used because it is magnetically conductive. Aluminum end plates are installed on each end of the stacks of laminates. The end plates are made of aluminum because it is not magnetically conductive. Thus, the end plates confine the magnetic field to the circumference of the rotor where it interacts with the stator. One end plate, which is not visible in FIG. 3, is axially retained against a shoulder in the shaft 26. The other end plate 64 is axially retained by a nut 66 that is screwed onto a threaded section of shaft 26.

Figure 4:
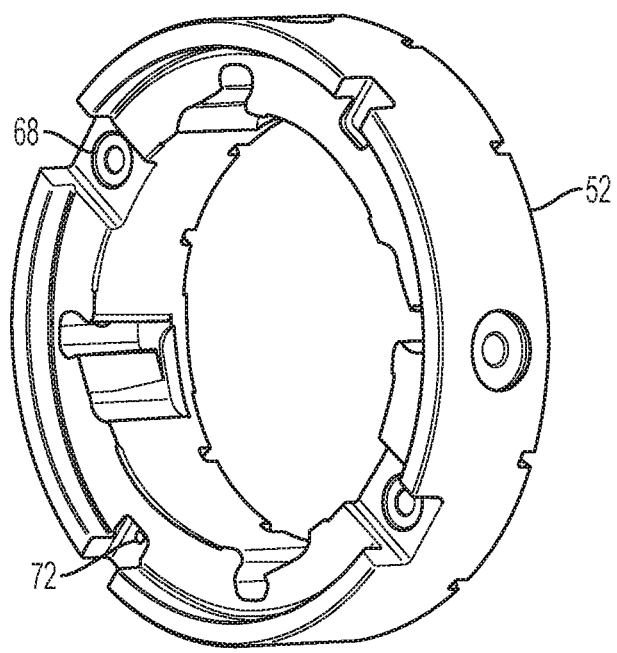
FIG. 4 is a pictorial view of a pocket plate of the selectable one-way-clutch of FIG. 2.

FIG. 4 illustrates a one-way-clutch pocket plate 52. The pocket plate 52 and end plate 64 include features for attaching the pocket plate to the rotor. Dowels are inserted into holes 70 in the end plate and fit into holes 72 in the pocket plate to accurately position the pocket plate relative to the end plate. Then, bolts are inserted through holes 68 in the pocket plate into threaded holes 74 in the end plate. The dowels and the bolts must be made of magnetically non-permeable material, such as stainless steel, to avoid altering the magnetic flux path within the rotor. These bolts are relatively expensive due to low production volume. Furthermore, the thickness of the end plate provides limited thread engagement.

Figure 5:
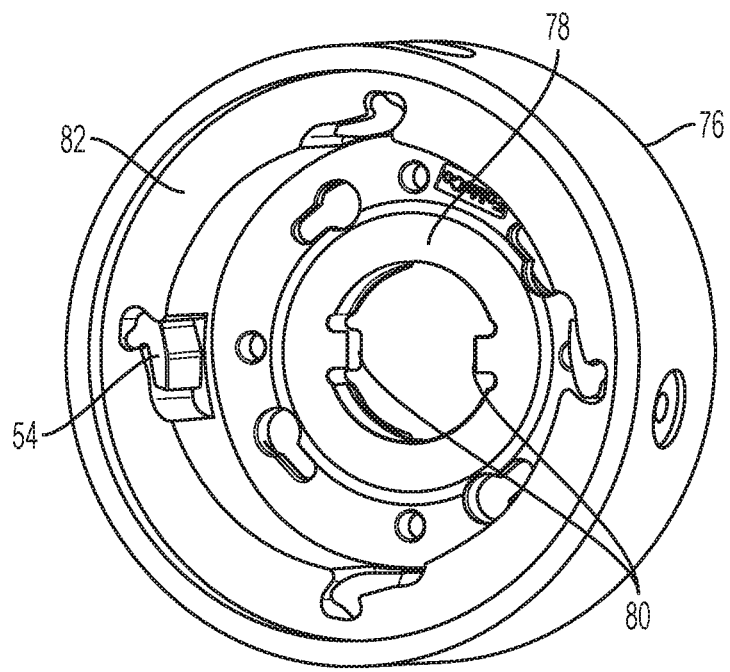
FIG. 5 is a pictorial view of a one-way-clutch pocket plate suitable for use in the powertrain of FIG. 1.
Figure 6:
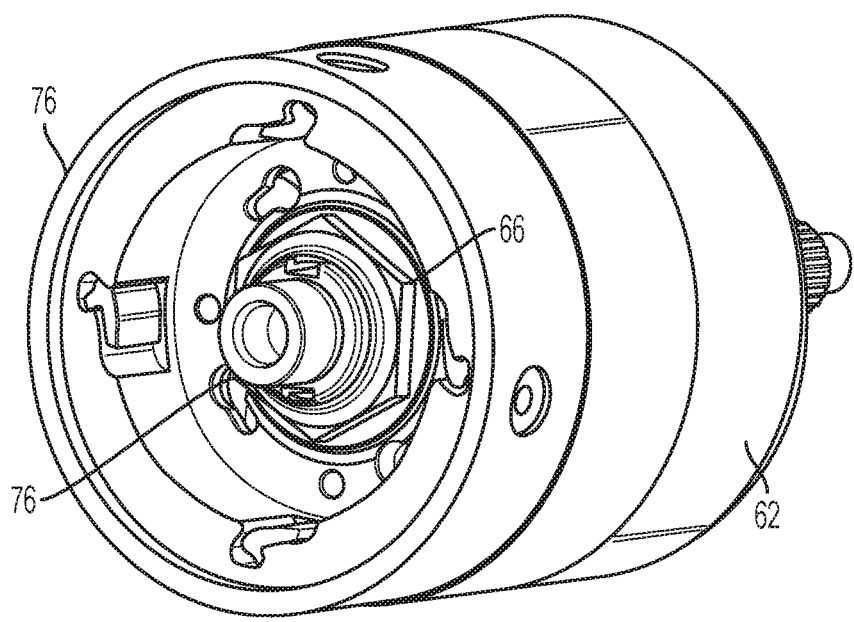
FIG. 6 is a pictorial view of the one-way-clutch pocket plate of FIG. 5 attached to a permanent magnet rotor.
Figure 7:
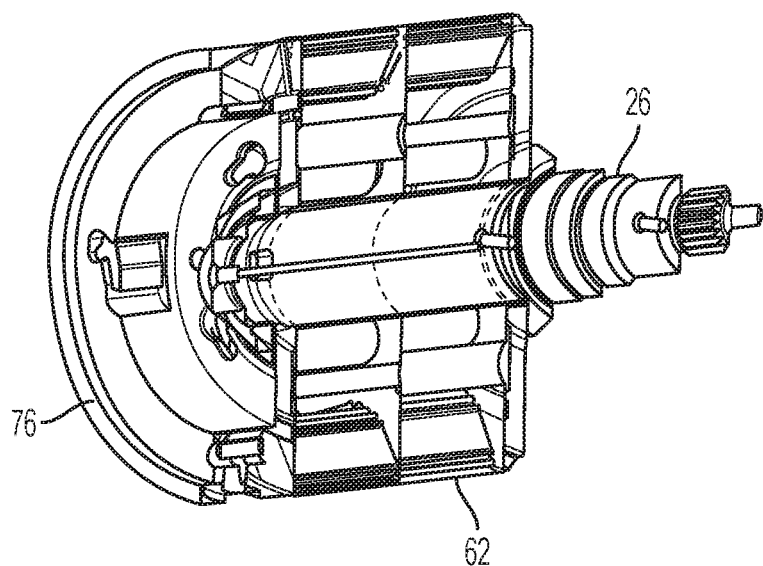
FIG. 7 is a cut-away view of the one-way-clutch pocket plate of FIG. 5 attached to a permanent magnet rotor.

FIG. 5 illustrates an aluminum pocket plate 76. Pocket plate 76 may be formed as a single piece using, for example, a die-casting process. Some machining may be required. The pocket plate 76 includes a flat portion 78 having a central aperture. Two tabs 80 extend into the aperture. The pocket plate also includes a thickened annular portion 82 axially proximate to the flat portion and concentric with the aperture. A plurality of pawls 54 are inserted into pockets formed around an inner periphery of the annular portion. FIGS. 6 and 7 show a permanent magnet rotor that includes pocket plate 76. The tabs 80 fit into slots in shaft 26 as pocket plate 76 is inserted onto shaft 26. Nut 66 is threaded onto shaft 26 and tightened to hold the pocket plate against the laminate stack 26. No end plate is required on one end of the rotor. No dowels or bolts are required, so there is no tendency to disrupt the magnetic flux path.

Figure 8:
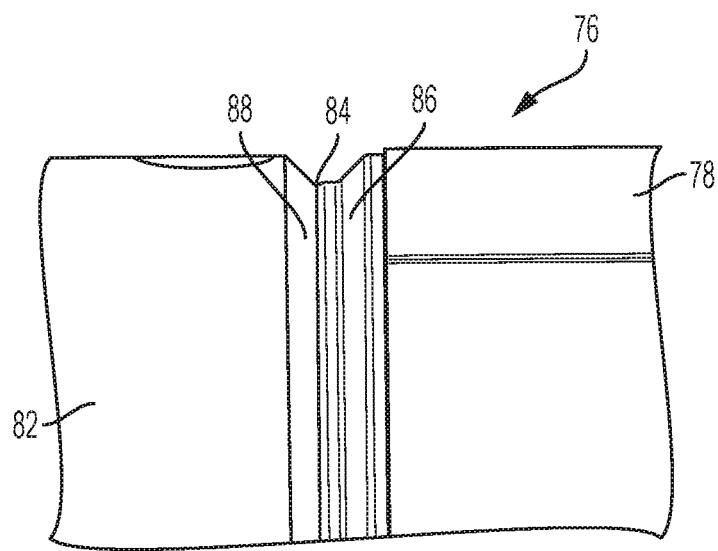
FIG. 8 is a side view of an alternative embodiment of the pocket plate of FIG. 4.

FIG. 8 illustrates an alternative way to fabricate pocket plate 76. In this alternative, the flat portion 78 and the annular portion 82 are fabricated separately and then joined with a laser weld 84. To facilitate even weld penetration into each part, end plate 78 includes a chamfered surface 86 and annular portion 82 includes a chamfered surface 88.

Figure 9:
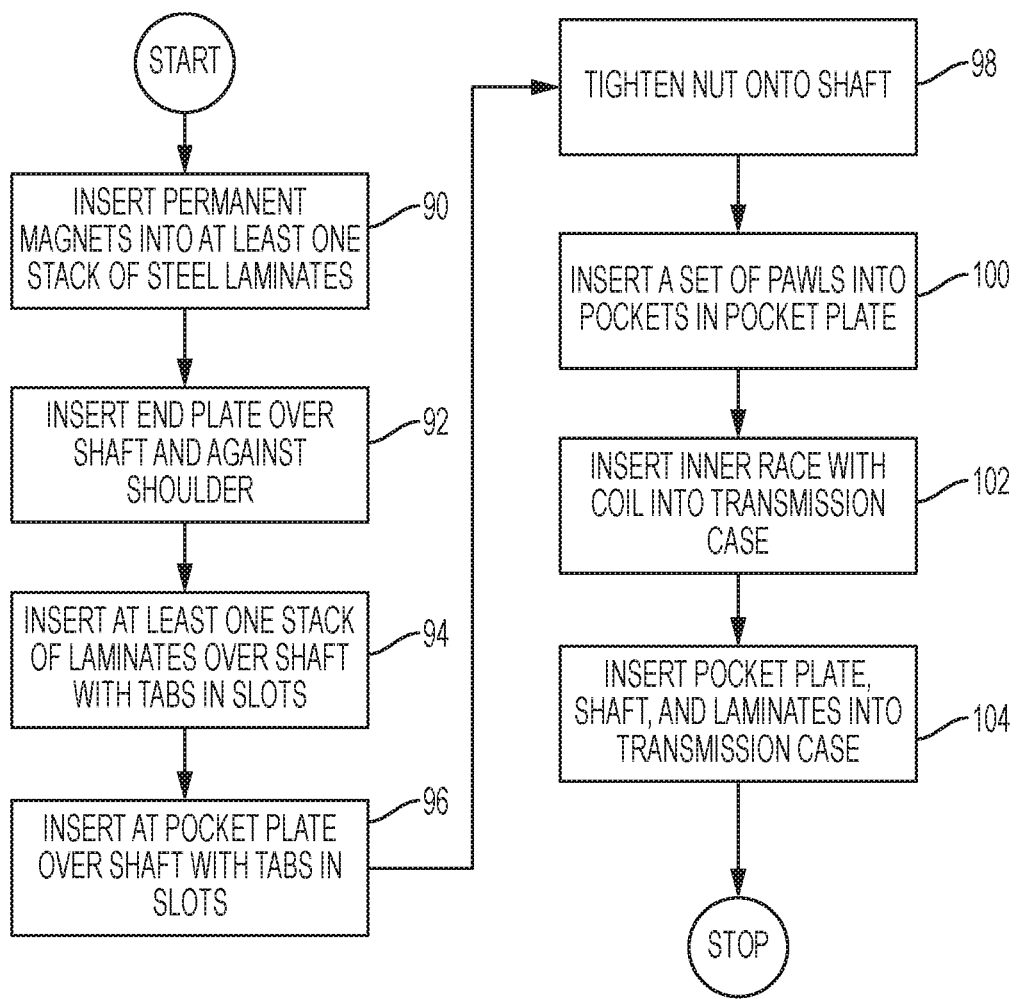
FIG. 9 is a flow chart for a process of assembling the powertrain of FIG. 1.

FIG. 9 illustrates a process of assembling a hybrid transmission. At 90, permanent magnets are inserted into a stack of laminates made of steel or some other magnetically conductive material. At 92, an end plate is inserted over a shaft. The end plate is restrained axially by a shoulder formed into the shaft. At 94, the at least one stack of laminates is inserted over the shaft. The laminates include tabs that fit into axial slots in the shaft to prevent relative rotation. At 96, a pocket plate is inserted over the shaft. The pocket plate also includes tabs that fit into the slots in the shaft. At 98, a nut is tightened onto a threaded portion of the shaft. At 100, a set of pawls is inserted into a set of pockets formed in the pocket plate. At 102, a one-way-clutch inner race is inserted into a transmission case. The inner race includes a coil. At 104, the pocket plate, shaft, and laminates are inserted into the transmission case with the pawls in proximity to the inner race, such that the coil produces a magnetic field that attracts the pawls into engagement with the inner race.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A hybrid transmission comprising:
a rotor assembly including
a stack of laminates containing permanent magnets and defining a laminate central aperture, and
a slotted rotor shaft extending through the stack of laminates and a first end plate, the slotted rotor shaft engaging the first end plate axially such that the end plate is restrained;
a one-way-clutch pocket plate configured to act as a second end plate of the rotor assembly and defining a pocket plate central aperture and a tab extending into the pocket plate central aperture that engages a slot in the slotted rotor shaft to preclude relative rotation, the one-way-clutch pocket plate having an annular ridge portion around a periphery of the pocket plate extending away from the rotor assembly, the annular ridge portion including a plurality of pockets spaced around the periphery of the pocket plate; and
a nut securing the pocket plate and the rotor assembly axially against the first end plate.

2. The hybrid transmission of claim 1 further comprising:
a transmission case;
a plurality of pawls retained in the plurality of pockets, respectively; and
a one-way-clutch inner race proximate to the pocket plate, the inner race including an electric coil configured to create a magnetic field attracting the pawls into engagement with the inner race.

3. The hybrid transmission of claim 2 further comprising:
a simple planetary gear set having a sun gear fixed to the rotor shaft, a ring gear drivably connected to an output shaft, and a carrier fixed to an input shaft; and
a second rotor drivably connected to the output shaft.

4. A one-way-clutch pocket plate comprising:
a body for attachment to a rotor assembly having
a flat end plate portion having a contact face for engaging the rotor assembly, defining an aperture and defining at least one tab extending into the aperture and in a plane defined by the flat portion, the at least one tab configured to engage slots of a rotor shaft of the rotor assembly to prevent relative rotation, and
an annular clutch portion surrounding and fixed to the flat portion and concentric with the aperture, the annular portion including a ridge section extending axially opposite the contact face of the flat end plate, the ridge defining a plurality of pockets along an inner periphery of the annular portion; and
a plurality of pawls retained within the pockets such that each of the plurality of pawls is adjacent an inner race of the annular clutch portion.

5. The pocket plate of claim 4 wherein the plurality of pockets is formed on a radially inner surface of the annular portion.

6. The hybrid transmission of claim 1, wherein the one-way-clutch pocket plate is magnetically non-conductive.

7. The hybrid transmission of claim 6, wherein the one-way-clutch pocket plate confines a magnetic field to a circumference of the rotor assembly without disrupting the magnetic flux path.

8. The hybrid transmission of claim 6, wherein the one-way-clutch pocket plate is aluminum.

* * * * *